United States Patent
Li (10) Patent No.: US 10,164,786 B2
(45) Date of Patent: Dec. 25, 2018

(54) INDUSTRY INTERNET FIELD BROADBAND BUS ARCHITECTURE SYSTEM

(71) Applicant: KYLAND TECHNOLOGY CO., LTD., Beijing (CN)

(72) Inventor: Ping Li, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 186 days.

(21) Appl. No.: 15/264,123

(22) Filed: Sep. 13, 2016

(65) Prior Publication Data

US 2017/0373873 A1    Dec. 28, 2017

(30) Foreign Application Priority Data

Jun. 23, 2016  (CN) .......................... 2016 1 0466545
Jul. 5, 2016  (CN) .......................... 2016 1 0525317

(51) Int. Cl.
| | | |
|---|---|---|
| H04L 12/28 | (2006.01) | |
| G06F 13/42 | (2006.01) | |
| H04L 12/40 | (2006.01) | |
| H04L 12/54 | (2013.01) | |

(52) U.S. Cl.
CPC ........ H04L 12/2801 (2013.01); G06F 13/426 (2013.01); H04L 12/40 (2013.01); H04L 12/40013 (2013.01); H04L 12/40123 (2013.01); H04L 12/56 (2013.01)

(58) Field of Classification Search
None
See application file for complete search history.

(56) References Cited

U.S. PATENT DOCUMENTS

| | | | |
|---|---|---|---|
| 3,856,993 A | 12/1974 | Closs et al. | |
| 5,960,001 A | 9/1999 | Shaffer et al. | |
| 7,339,924 B1* | 3/2008 | Chung ................ | H04L 12/4633 370/356 |
| 7,616,646 B1* | 11/2009 | Ma ...................... | H04L 12/2896 370/392 |
| 2002/0010518 A1* | 1/2002 | Reid .................... | G06Q 10/087 700/31 |
| 2007/0027485 A1* | 2/2007 | Kallmyer ............... | A61N 1/372 607/2 |

(Continued)

FOREIGN PATENT DOCUMENTS

| | | |
|---|---|---|
| JP | H03-155241 A | 7/1991 |
| JP | 2005-184616 A | 7/2005 |
| JP | 2011-077992 A | 4/2011 |

OTHER PUBLICATIONS

European Search Report for EP 16 18 8010 dated Oct. 4, 2016.

*Primary Examiner* — Henry Tsai
*Assistant Examiner* — Aurangzeb Hassan
(74) *Attorney, Agent, or Firm* — Arent Fox LLP (57) ABSTRACT

The invention relates to an industry internet field broadband bus architecture system based on the two-wire data transmission network widely used in the traditional industry control system, so that the system can provide high-performance Ethernet communication without modifying original wiring and topologies, thus providing a high-performance, highly reliable, highly real-time, and highly secured solution to switching an industry control system field layer network from a traditional field bus to an industry Ethernet bus.

11 Claims, 4 Drawing Sheets

(56) References Cited

U.S. PATENT DOCUMENTS

2015/0089080 A1\* 3/2015 Alsup .................... H04L 49/90
  709/235
2016/0072929 A1\* 3/2016 Alsup ............... H04L 12/40156
  370/392

\* cited by examiner

INDUSTRY INTERNET FIELD BROADBAND BUS ARCHITECTURE SYSTEM

This application claims the benefit of Chinese Patent Application No. 201610525317.6, filed with the State Intellectual Property Office of People's Republic of China on Jul. 5, 2016 and entitled "An Industry Internet Field Broadband Bus Architecture System", and the benefit of Chinese Patent Application No. 201610466545.0, filed with the State Intellectual Property Office of People's Republic of China on Jun. 23, 2016 and entitled "An Industry Internet Field Broadband Bus Architecture System", the content of which is hereby incorporated by reference in its entirety.

FIELD

The present invention relates to the field of communications, and particularly to an industry internet field broadband bus architecture system.

BACKGROUND

Figure 1:
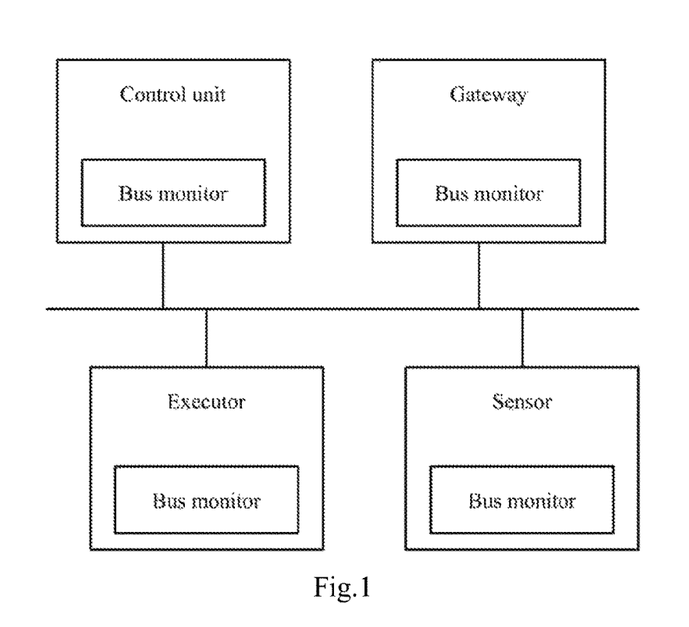
FIG. 1 illustrates a schematic structural diagram of the serial bus system in the prior art.

A serial bus system has been increasingly applied in automatization and manufacturing, where all the users are connected by a serial bus into a network, and data are exchanged over the bus in a master-slave mode. In the prior art, there is a bus station system with an integrated bus supervision control function as illustrated in FIG. 1, where the system includes bus monitors added respectively to a control unit, a gateway, an executor, and a sensor to supervise in real time the data over the bus. The system has the networks interconnected by the gateway, and the number of bus monitors makes the bus system too complex in structure, costly in hardware, and difficult to manage and maintain later.

The Ethernet and the Controller Area Network (CAN) bus remain the mostly widely applied at present, but they also suffer particularly from the following drawbacks:

1) Since the Ethernet operates with Carrier Sense Multiple Access with Collision Detection (CSMA/CD), if the network is heavily loaded (more than 40%), then the deterministic network may not accommodate required real-time industry control. For example, if a two-wire Ethernet transmission device communicates data with CSMA/CD, then the reliability of transmission in the system may be poor in this transmission mode.

2) The operating CAN bus is characterized in that the event trigger mechanism thereof causes events in the network to collide easily with each other, so that transmission over a channel may be subjected to an error and a jam, thus resulting in poor reliability of the system, and even if the collision can be resolved by arbitration, then data transmission at a low priority may not be real-time; and if master and slave stations operate, then the different stations in the distributed control system will need to be connected for communication, and one of the nodes will transmit information on its own initiative to the other nodes over the network at any instance of time without distinguishing the master station from the slave stations, so that the respective nodes communicating freely may occupy significant components of the channel, thus suppressing the transmission rate of the data over the channel, and degrading the performance of transmission.

At present, network transmission has been widespread all over the world, the security of transmit data influences directly the security of our working, living, and even nation, so it is highly desirable to provide a high-performance, highly reliable, and highly real-time industry internet communication system.

SUMMARY

Embodiments of the invention provide an industry internet field broadband bus architecture system so as to address the problems of low performance of, and poorly real-time and unreliable data transmission in the industry control system in the prior art.

An embodiment of the invention provides an industry internet field broadband bus architecture system including a bus controller and at least one bus terminal, and the bus controller is connected with the respective bus terminals over a two-wire data transmission network, wherein:

the bus controller is synchronized in clock with the respective bus terminals; allocates time slices for the bus controller and the respective bus terminals; and transmits first data to be transmitted, in their respective time slices; and the bus terminals are configured to transmit second data to be transmitted, in their respective time slices.

Furthermore the bus controller is further configured to acquire the data, and then determine whether the data are real-time data or non-real-time data; and if the data are real-time data, to store the real-time data into a first real-time data container; otherwise, to store the non-real-time data into a first non-real-time data container; and the bus terminals are further configured to acquire the data, and then determine whether the data are real-time data or non-real-time data; and if the data are real-time data, to store the real-time data into a second real-time data container; if the data are non-real-time data, to store the non-real-time data into a second non-real-time data container.

Furthermore the bus controller is configured to determine whether the bus controller operates in the time slice thereof, and if the bus controller operates in the time slice thereof, to retrieve the real-time data from the first real-time data container in the time slice as the first data to be transmitted, and to transmit the first data; and if the real-time data container is empty, to retrieve the data from the first non-real-time data controller as the first data, and to transmit the first data; and the bus terminals are configured to determine whether the bus terminals operate in their respective time slices, and if the bus terminals operate in their respective time slices, to retrieve the real-time data from the second real-time data container in the time slices as the second data to be transmitted, and to transmit the second data; and if the real-time data container is empty, to retrieve the data from the second non-real-time data controller as the second data, and to transmit the second data.

Furthermore the bus controller is further configured, if the bus controller does not operate in its time slice, to retrieve the data from the first non-real-time data container, and to transmit the retrieved non-real time data using carrier sense multiple access/collision detection (CSMA/CD); and the bus terminals are further configured to, if the bus terminals do not operate in their respective time slices, to retrieve the data from the second non-real-time data container, and to transmit the retrieved non-real time data using carrier sense multiple access/collision detection (CSMA/CD).

Furthermore if it is determined that the data acquired are real-time data, then the bus controller and the bus terminals are configured to transmit the data in the time slices over the Time-Triggered Ethernet (TTE) or the Time Division Multiple Access (TDMA).

Furthermore the bus controller is further configured to obtain data to be transmitted to an external network, to convert the data into a message in a format corresponding to the external network, and to transmit the message to the external network.

Furthermore the bus controller is further configured to learn Media Access Control (MAC) addresses of devices over the two-wire data transmission network, to allocate corresponding Internet Protocol Address (IP) addresses and bus device addresses for the respective learnt MAC addresses, and to update a pre-created three-dimension correspondence relationship using the learnt MAC addresses, and the corresponding IP addresses and bus device addresses; and to determine for each piece of data received over the two-wire data transmission network whether a correspondence relationship between a MAC address, an IP address, and a bus device address carried in the data is among the three-dimension correspondence relationship, and if so, to determine that the data are legal data; otherwise, to determine that the data are illegal data.

Furthermore the bus controller is further configured to transmit the three-dimension correspondence relationship to the respective bus terminals; and the respective bus terminals are further configured to determine for each piece of data received over the two-wire data transmission network whether a correspondence relationship between a MAC address, an IP address, and a bus device address carried in the data is among the three-dimension correspondence relationship, and if so, to determine that the data are legal data; otherwise, to determine that the data are illegal data.

Furthermore the bus controller is configured to transmit the first data to be transmitted, in the time slice thereof using orthogonal frequency division multiplexing (OFDM) or baseband transmission; and the bus terminals are configured to transmit the second data to be transmitted, in their respective time slices using orthogonal frequency division multiplexing (OFDM) or baseband transmission.

Furthermore orthogonal frequency division multiplexing (OFDM) is applicable at the physical layer.

Furthermore the system further includes:

a bus configuration and monitoring element connected with the bus controller, configured to transmit configuration information or a supervision instruction for at least one device over the two-wire data transfer network to the bus controller so that the bus controller transmits the configuration information to the corresponding device; and to receive operating state information, transmitted by the bus controller, generated by at least one device over the two-wire data transfer network.

Furthermore the bus configuration and monitoring element communicates with the bus controller over an RS485 bus; or the bus controller is further configured to allocate a time slice for the bus configuration and monitoring element, and the bus configuration and monitoring element is further configured to communicate with the bus controller in its time slice using orthogonal frequency division multiplexing (OFDM) or baseband transmission.

Furthermore the system further includes:

an application monitoring device connected with the bus controller, configured to acquire data and control in real-time for the bus controller and the respective bus terminals.

Advantageous effects of the invention are as follows: in the industry internet field broadband bus architecture system according to the embodiments of the invention, the bus controller and the bus terminals are synchronized in clock in the precise clock synchronization protocol, and the bus controller allocates the time slices for the bus controller and the respective bus terminals so that the bus controller and the bus terminals transmit data to be transmitted, in their respective time slices to thereby ensure timely and temporally deterministic data transmission. Thus the embodiments of the invention provide a high-performance, highly reliable and highly real-time industry internet field broadband bus architecture system. Moreover a transmission medium of the two-wire data transmission network can be a twisted pair or a shielded twisted pair so that the system according to the embodiments of the invention can be applicable to a traditional industry control facility using a bus, and provide high-performance Ethernet communication without modifying original wiring and topologies, thus providing a high-performance, highly reliable, highly real-time, and highly secured solution to switching an industry control system field layer network from a traditional field bus to an industry Ethernet bus. Accordingly the system according to the embodiments of the invention can be highly universally applicable.

BRIEF DESCRIPTION OF THE DRAWINGS

In order to make the technical solutions according to the embodiments of the invention or in the prior art more apparent, the drawings to which a description of the embodiments or the prior art refers will be briefly introduced below, and apparently the drawings to be described below are merely illustrative of some of the embodiments of the invention, and those ordinarily skilled in the art can derive from these drawings other drawings without any inventive effort. In the drawings.

DETAILED DESCRIPTION OF THE EMBODIMENTS

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention.

Field data acquisition and control in an industry control system will be described below.

Figure 2:
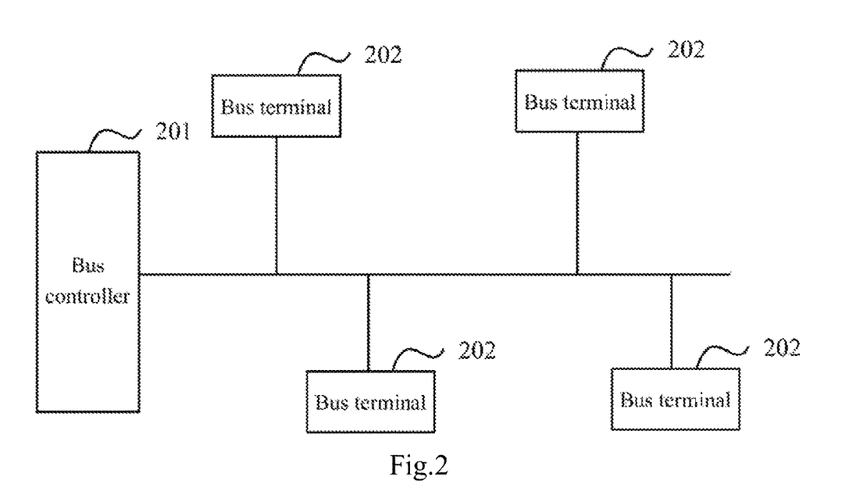
FIG. 2 illustrates a first schematic structural diagram of an industry internet communication system according to an embodiment of the invention.

As illustrated in FIG. 2, there is a schematic structural diagram of an industry internet field broadband bus architecture system according to an embodiment of the invention, where the system includes a bus controller 201 and at least one bus terminal 202, and the bus controller 201 is connected with the respective bus terminals 202 over a two-wire data transmission network, where:

The bus controller 201 is synchronized in clock with the respective bus terminals 202; allocates time slices for the bus controller 201 and the respective bus terminals 202; and transmits first data to be transmitted, in its time slices; and The bus terminals 202 are configured to transmit second data to be transmitted, in their respective time slices.

Here in an embodiment, the bus controller 201 and the respective bus terminals 202 can transmit the data in the time slices over the Time-Triggered Ethernet (TTE) or using the TDMA.

Here in an embodiment, a precise clock synchronization protocol can be the IEEE1588 protocol. Of course, in a particular implementation, they can alternatively be synchronized in clock in another protocol capable of precise clock synchronization, so the embodiment of the invention will not be limited thereto.

In the industry internet field broadband bus architecture system according to the embodiment of the invention, the bus controller and the bus terminals are synchronized in clock in the precise clock synchronization protocol, and the bus controller 201 allocates the time slices for the bus controller 201 and the respective bus terminals 202 so that the bus controller 201 and the bus terminals 202 transmit data to be transmitted, in their respective time slices to thereby ensure timely and temporally deterministic data transmission. Thus the embodiment of the invention provides a high-performance, highly reliable and highly real-time industry internet field broadband bus architecture system. Moreover a transmission medium of the two-wire data transmission network can be a twisted pair or a shielded twisted pair so that the system according to the embodiment of the invention can be applicable to a traditional industry control facility using a bus, and thus can be highly universally applicable.

In order to facilitate further understanding of the industry internet field broadband bus architecture system according to the embodiment of the invention, the embodiment of the invention will be further described below.

Here in an embodiment, in a real application, data over a broadband bus can include real-time data and non-real-time data, where the real-time data require highly temporally deterministic and timely data transmission, and the non-real-time data require less temporally deterministic and timely data transmission, so that in an embodiment of the invention, the data can be divided in advance into real-time data and non-real-time data so that different transmission strategies are applied to the different data, particularly as follows:

The bus controller 201 is further configured to acquire the data, and then determine whether the data are real-time data or non-real-time data; and if the data are real-time data, to store the real-time data into a first real-time data container; if the data are non-real-time data, to store the non-real-time data into a first non-real-time data container; and The bus terminals 202 are further configured to acquire the data, and then determine whether the data are real-time data or non-real-time data; and if the data are real-time data, to store the real-time data into a second real-time data container; if the data are non-real-time data, to store the non-real-time data into a second non-real-time data container.

Thus the first data to be transmitted can be transmitted by transmitting the real-time data preferentially. Particularly the bus controller 201 is configured to determine whether the bus controller operates in the time slice thereof, and if the bus controller 201 operates in the time slice thereof, to retrieve the real-time data from the first real-time data container in the time slice as the first data to be transmitted, and to transmit the first data; and if the real-time data container is empty, to retrieve the data from the first non-real-time data controller as the first data, and to transmit the first data.

Alike the second data to be transmitted can be transmitted by transmitting the real-time data preferentially. The bus terminals 202 are configured to determine whether the bus terminals operate in their respective time slices, and if the bus terminals operate in their respective time slices, to retrieve the real-time data from the second real-time data container in the time slices as the second data to be transmitted, and to transmit the second data; and if the real-time data container is empty, to retrieve the data from the second non-real-time data controller as the second data, and to transmit the second data.

It shall be noted that the bus controller 201 and the respective bus terminals 202 need to determine whether the corresponding real-time data containers (the first real-time data container or the second real-time data container) are empty, before the non-real-time data are transmitted each time. Taking the bus controller 201 as an example, the bus controller 201 retrieves the data from the first real-time data container, and if the first real-time data container is empty, then the bus controller will retrieve the data from the first non-real-time data container as the first data to be transmitted, and transmit the first data; and then the bus controller will further determine whether to retrieve the data from the first real-time data container, and if the first real-time data container is empty, then the bus controller will retrieve again the data from the first non-real-time data container as the first data to be transmitted, and transmit the first data. This is done for the reason that the real-time data may be newly generated aperiodically and added to the real-time data container. For example, if non-real-time data are transmitted, then new real-time data will be generated, and in order to ensure the real-time data to be transmitted in a timely manner, it will be necessary to determine that the real-time data container is empty, before the non-real-time data are transmitted each time.

Here in an embodiment, in order to make reasonable use of data transmission resources, the bus controller 201 is further configured, if the bus controller does not operate in its time slice, to retrieve the data from the first non-real-time data container, and to transmit the retrieved non-real time data using carrier sense multiple access/collision detection (CSMA/CD); and The bus terminals 202 are further configured to, if the bus terminals do not operate in their respective time slices, to retrieve the data from the second non-real-time data container, and to transmit the retrieved non-real time data using carrier sense multiple access/collision detection (CSMA/CD).

Thus the non-real-time data can be transmitted on a selected reasonable occasion to thereby improve the efficiency of data transmission, and the utilization ratio of data transmission resources.

Here in an embodiment, if it is determined that the data acquired are real-time data, then the bus controller 201 and the bus terminals 202 will be configured to transmit the data in the time slices over the Time-Triggered Ethernet (TTE) or the TDMA.

Here in an embodiment, in order to achieve good communication between the industry internet broadband bus and another network, the industry internet broadband bus is networked with another field bus network. In an embodiment of the invention, the bus controller 201 is further configured to obtain data to be transmitted to an external network, to convert the data into a message in a format corresponding to the external network, and to transmit the message to the external network, where the external network can be a Process Field Bus, a Modbus communication protocol, a Controller Area Network (CAN), CANopen, RS485/CAN, etc., for example:

Here in an embodiment, in order to improve the security of the system according to the embodiment of the invention, the bus controller 201 is further configured to learn MAC addresses of devices over the two-wire data transmission network, to allocate corresponding IP addresses and bus device addresses for the respective learnt MAC addresses, and to update a pre-created three-dimension correspondence relationship using the learnt MAC addresses, and the corresponding IP addresses and bus device addresses; and To determine for each piece of data received over the two-wire data transmission network whether a correspondence relationship between a MAC address, an IP address, and a bus device address carried in the data is among the three-dimension correspondence relationship, and if so, to determine that the data are legal data; otherwise, to determine that the data are illegal data.

Thus the three-dimension correspondence relationship is equivalent to a white list, where data transmitted by a device in the white list are legal data, and data transmitted by a device out of the white list are illegal data, so that the illegal data can be avoided in effect from being transmitted and disseminated by the bus controller 201.

Here in an embodiment, in order to further improve the security of the system according to the embodiment of the invention, the bus controller 201 is further configured to transmit the three-dimension correspondence relationship to the respective bus terminals 202; and The respective bus terminals 202 are further configured to determine for each piece of data received over the two-wire data transmission network whether a correspondence relationship between a MAC address, an IP address, and a bus device address carried in the data is among the three-dimension correspondence relationship, and if so, to determine that the data are legal data; otherwise, to determine that the data are illegal data.

Thus the three-dimension correspondence relationship are transmitted to the bus terminals 202 so that the bus terminals 202 are also provided with the white list, data transmitted by a device in the white list are legal data, and data transmitted by a device out of the white list are illegal data, so that the illegal data can be avoided in effect from being transmitted and disseminated by the bus terminals 202.

Here in an embodiment, in order to improve the efficiency of data transmission, the bus controller 201 is configured to transmit the first data to be transmitted, in the time slice thereof using orthogonal frequency division multiplexing (OFDM) or baseband transmission; and The bus terminals 202 are configured to transmit the second data to be transmitted, in their respective time slices using orthogonal frequency division multiplexing (OFDM) or baseband transmission.

Here in an embodiment, orthogonal frequency division multiplexing (OFDM) is applicable at the physical layer. For example, the bus controller 201 and the bus terminals 202 modulate Ethernet data using orthogonal frequency division multiplexing at the physical layer to thereby transmit an Ethernet packet over a pair of data lines at a high speed. Moreover the bus controller 201 and the bus terminals 202 can also transmit an Ethernet packet using baseband transmission.

Figure 3:
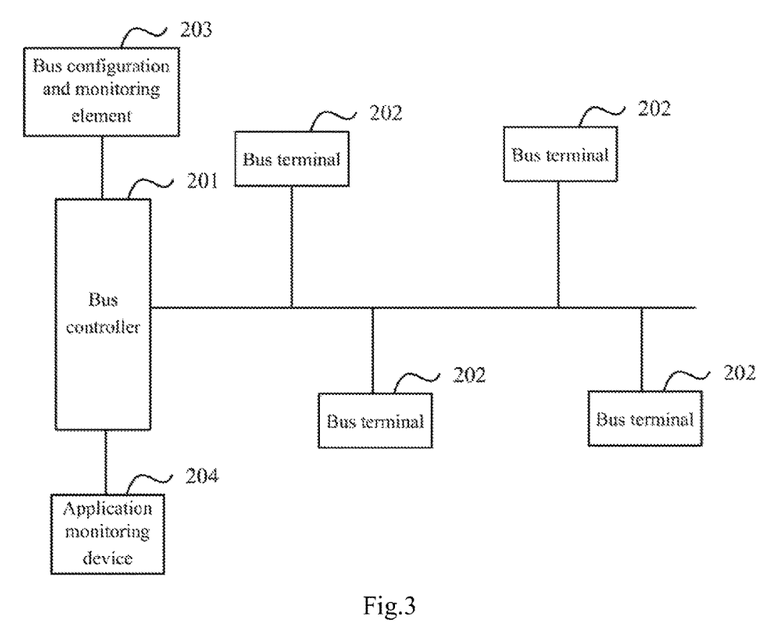
FIG. 3 illustrates a second schematic structural diagram of an industry internet communication system according to an embodiment of the invention.

Here in an embodiment, in order to monitor the respective bus terminals 202, subordinated to the bus terminals 202, etc., the system as illustrated in FIG. 3 further includes:

A bus configuration and monitoring element 203 connected with the bus controller 201 is configured to transmit configuration information or a supervision instruction for at least one device over the two-wire data transfer network to the bus controller 201 so that the bus controller 201 transmits the configuration information to the corresponding device; and To receive operating state information, transmitted by the bus controller 201, generated by at least one device over the two-wire data transmission network.

Here in an embodiment, the bus configuration and monitoring element 203 communicates with the bus controller 201 over an RS485 bus so that this communication scheme is simple and applicable to a small amount of data.

Alternatively if there is a large amount of data, then the bus controller 201 will be further configured to allocate a time slice for the bus configuration and monitoring element 203, and the bus configuration and monitoring element 203 will be further configured to communicate with the bus controller 201 in its time slice using orthogonal frequency division multiplexing (OFDM) or baseband transmission. Thus the configuration information and the supervision instruction in the system according to the embodiment of the invention can be systematically unified and global, and thus can well facilitate an industry field in which a large number of configuration and supervision operations are required.

Here in an embodiment, the bus configuration and monitoring element is primarily configured to configure parameters of the system according to the invention. Moreover in order to configure parameters of industry field devices, the system as illustrated in FIG. 3 further includes:

An application monitoring device 204 connected with the bus controller 201 is configured to acquire data and control in real-time for the bus controller 201 and the respective bus terminals 202.

Where the application monitoring device 204 accesses in real time, including data acquisition and real-time control, the bus controller 201 and the respective bus terminals 202 over the industry Ethernet broadband bus. Thus over their direct connections with the bus controller 201, the bus controller 201 is responsible for unified allocation of time slots in which data of the bus system are passed, and the application monitoring device can transmit configuration parameters or acquisition commands and real-time control commands to be passed, directly in the time slots allocated by the bus controller 201 in a unified manner for passing the data, so that a real-time access throughout the application monitoring system for data acquisition and real-time control can become more rapid and convenient.

Here the industry Ethernet broadband bus can be a two-wire data transmission network, or can be an Ethernet line, an RS485 bus, a serial interface bus, or another network capable of communication. In a particular implementation, the industry Ethernet broadband bus can be set as needed in reality, and the embodiment of the invention will not be limited thereto.

In an embodiment of the invention, the bus controller can allocate the time slices for the respective bus terminals particularly as follows:

The bus controller receives time slice allocation requests transmitted by the bus terminals, where the time slice allocation requests include the amounts of the second data to be transmitted of the bus terminals; allocates the time slices for the second data to be transmitted of the bus terminals according to the amounts of the second data to be transmitted of the bus terminals, and unallocated time slices, and obtains time slice allocation information; and transmits the time slice allocation information of the bus terminals to the bus terminals 202 so that the bus terminals 202 transmits the second data to be transmitted of the bus terminals according to the time slice allocation information.

Here in an embodiment, a limited amount of data can be transmitted in one time slice, and the numbers of time slices to be allocated can be determined as a function of the amounts of the second data to be transmitted of the bus terminals. Thus the time slice allocation information can include time slice identifiers of the respective allocated time slices so that the bus terminals 202 can determine those time slices to be occupied by the bus terminals.

Thus the bus controller 201 allocates the time slices for the bus terminals 202 in response to the time slice allocation requests of the bus terminals 202 so that the bus terminals 202 can transmit the second data to be transmitted, in their allocated time slices. In this way, the bus terminals 202 can transmit the data in their respective time slices to thereby ensure temporally deterministic data transmission.

Figure 4:
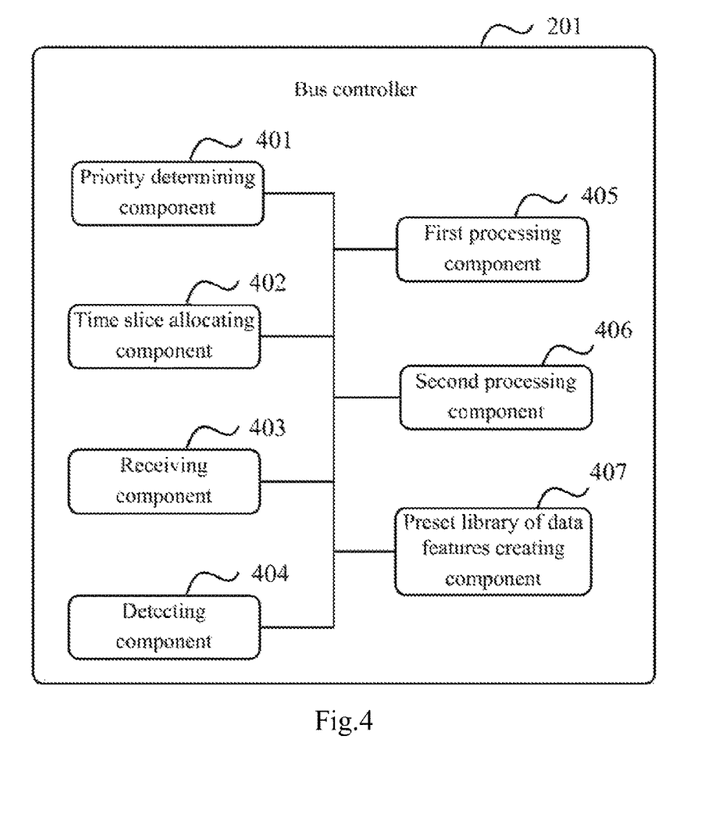
FIG. 4 illustrates a schematic structural diagram of a bus controller according to an embodiment of the invention.

Here in an embodiment of the invention, in order to enable preferential transmission of the important second data to be transmitted, the time slice allocation requests can further include data identifiers of the second data to be transmitted, so that the bus controller 201 determines transmission levels of the second data to be transmitted according to the data identifiers. There are higher transmission levels corresponding to the important second data to be transmitted, and the time slices are allocated preferentially for the data at the higher transmission levels, so that the important data are transmitted preferentially. In view of this, as illustrated in FIG. 4, the bus controller 201 can particularly include:

A priority determining component 401 is configured to determine transmission priorities corresponding to the identifiers of the second data to be transmitted of the bus terminals according to a pre-stored correspondence relationship between a data identifier and a transmission priority;

Here in an embodiment of the invention, the data identifiers can be identifies representing service types; for example, the data identifiers identify pressure sensor data, temperature sensor data, etc. As depicted in Table 1, there is an example of data identifiers at their corresponding priorities, and of course, it shall be noted that Table 1 is merely intended to illustrate but not to limit an embodiment of the invention; and

TABLE 1

| Data identifier | Priority | Remark |
|---|---|---|
| 1 | High | Pressure sensor |
| 2 | Low | Device log |

A time slice allocating component 402 is configured to allocate the time slices for the second data to be transmitted according to the determined transmission priorities, the amounts of data of the second data to be transmitted, and the unallocated time slices, and to obtain the time slice allocation information.

Here in an embodiment, there may also be such data generated due to some accidental event in industry process control that need to be transmitted in a timely manner, and in view of this, in an embodiment of the invention, the bus terminals 202 can be further configured to obtain the second data to be transmitted, and then determine from the data identifiers of the second data to be transmitted whether the second data to be transmitted are data of a preset accidental event; and if the second data to be transmitted are data of a preset accidental event, then the bus terminals will transmit the data of the preset accidental event, so that in an embodiment of the invention, if data of a preset accidental event are generated, then the data of the preset accidental event will be transmitted preferentially regardless of whether there are data to be transmitted, in a time slice corresponding to the current instance of time, so that the important data of the accidental event can be transmitted preferentially, and thus the bus controller 201 can operate smoothly in the industry control process.

Here in an embodiment, if the data are not data of any preset accidental event, then the bus terminals will determine from the data identifiers of the second data to be transmitted whether the second data to be transmitted include data required to be temporally deterministic, and if so, then the bus terminals will generate the time slice allocation requests.

Here in an embodiment of the invention, in order to secure transmitted data, the transmitted data are typically encrypted and then transmitted in the prior art to thereby prevent the data from being falsified while being transmitted, but the security of the encrypted original data may not be guaranteed; for example, an existing sensor (e.g., a pressure sensor, a temperature sensor, etc.) becomes increasingly intelligent, and acquired data may be falsified by the sensor before the data are encrypted (for example, the data are falsified by malicious program in the sensor, the data are falsified abnormally by the sensor, etc.), so in an embodiment of the invention, in order to further improve the security of transmitted data, as illustrated in FIG. 4, the bus controller 201 further includes:

A receiving component 403 is configured to receive data transmitted by data transmitting devices;

A detecting component 404 is configured to detect the data for at least one feature in a preset data feature library.

A first processing component 405 is configured to determine that the data are legal data, if at least one feature in the preset data feature library is detected by the detecting component.

A second processing component 406 is configured to issue an alarm if no feature in the preset data feature library is detected by the detecting component.

Here in an embodiment of the invention, the bus controller 201 can subsequently process the data upon determining that the data are legal data; for example, if the data need to be transmitted to a next device, then the bus controller will transmit the data thereto. If the bus controller needs to be controlled using the data, then the bus controller will operate in response thereto.

Here in an embodiment of the invention, the alarm can include a source of the data so that a human operator can handle in response to the alarm.

Here in an embodiment of the invention, as illustrated in FIG. 4, the bus controller 201 can further include:

A preset library of data features creating component 407 is configured to create the preset data feature library by acquiring at least one piece of sample data for creating the preset data feature library from the data transmitting devices, and creating a set of sample data; obtaining from the set of sample data at least one of data duration distribution features of the data being transmitted by the data transmitting devices, amount of data distribution features of the data being transmitted by the data transmitting devices, transmission time distribution features of the data being transmitted by the data transmitting devices, value range features of specified data, the identifiers of the data transmitting devices, network protocol information, service types corresponding to the data, etc.; and creating the preset data feature library from the obtained data feature information.

For example, if the data transmitting devices include pressure sensors, temperature sensors, and flow sensors, then corresponding data will be acquired from these data transmitting devices as the sample data resulting in the set of sample data.

For the sake of easy understanding, the respective data feature information will be described below by way of an example:

(1) The data duration distribution features of the data being transmitted by the data transmitting devices:

For example, some data transmitting device transmit their data each time for different durations dependent upon different service types; for example, a data transmitting device A transmits data each time for a duration of one minute, and a data transmitting device B transmits data each time for a duration of 30 seconds.

(2) The amount of data distribution features of the data being transmitted by the data transmitting devices:

For example, if the data transmitting device A transmits data T1 and data T2, where the amount of data T1 is T1', and the amount of data T2 is T2', then the amount of data distribution feature of the data transmitting device A includes T1' and T2'. More preferably the distribution feature can further include periods of time, for example, if the data T1 are transmitted in a period of time 1, then the amount of data corresponding to the period of time 1 will be T1'; and alike if the data T2 are transmitted in a period of time 2, then the amount of data corresponding to the period of time 2 will be T2'.

(3) The transmission time distribution features of the data being transmitted by the data transmitting devices:

For example, if the data transmitting device A typically transmits data at instances of time TIME1, TIME2, TIME3, and TIME4, then received data transmitted by the data transmitting device A at TIME5 will be abnormal data.

(4) The value range features of specified data:

For example, if a value detected by a pressure sensor typically lies in some range of values, then a data feature of data of the pressure sensor will be this range of values. Of course, more precisely, there may be different ranges of values of different pressure sensors.

(5) The identifiers of the data transmitting devices:

The identifiers of the data transmitting devices are identifies capable of identifying the devices uniquely, e.g., a Media Access Control (MAC) address, an Internet Protocol (IP) address, etc., (6) The network protocol information:

For example, the network protocol information includes the User Datagram Protocol (UDP), the Transmission Control Protocol (TCP), or other network protocols.

(7) The service types corresponding to the data:

For example, the service types include flow detection, temperature detection, speed detection, pressure detection, etc. In a particular implementation, the user can define the service types as needed in reality, all of which can be applicable to the embodiment of the invention, but the embodiment of the invention will not be limited thereto.

Figure 5:
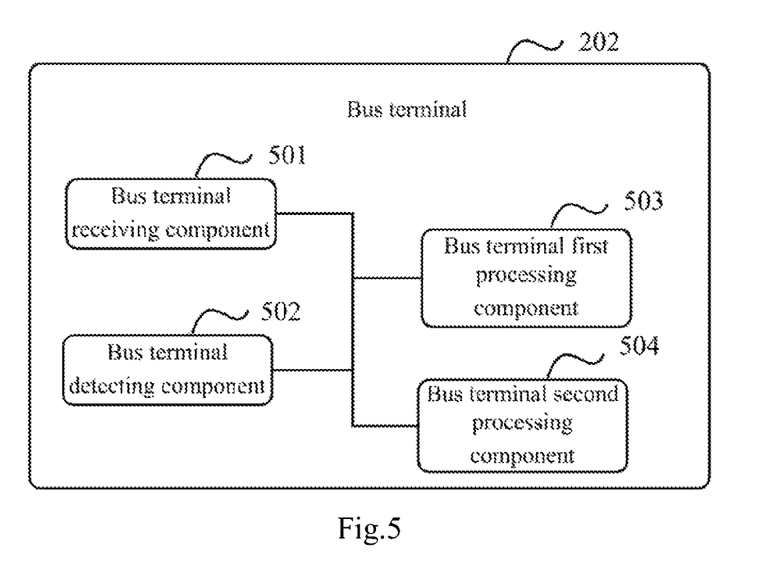
FIG. 5 illustrates a schematic structural diagram of a bus terminal according to an embodiment of the invention.

Here in an embodiment, as illustrated in FIG. 5, in order to enable the bus terminals 202 to detect the received data for features so as to secure the data, the bus terminals 202 can further include:

A bus terminal receiving component 501 is configured to receive data transmitted by data transmitting devices;

A bus terminal detecting component 502 is configured to detect the data for at least one feature in a preset data feature library;

A bus terminal first processing component 503 is configured to determine that the data are legal data, if at least one feature in the preset data feature library is detected by the detecting component;

A bus terminal second processing component 504 is configured to issue an alarm if no feature in the preset data feature library is detected by the detecting component.

Here in an embodiment, the bus terminals 202 can alternatively create the preset data feature library in the same way as the bus controller 201, so a repeated description thereof will be omitted here.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An industry internet field broadband bus architecture system, wherein the system comprises a bus controller and at least one bus terminal, and the bus controller is connected with the respective bus terminals over a two-wire data transmission network, wherein:

the bus controller is synchronized in clock with the respective bus terminals; allocates time slices for the bus controller and the respective bus terminals; and transmits first data to be transmitted, in their respective time slices;

the bus terminals are configured to transmit second data to be transmitted, in their respective time slices;

wherein the bus controller is further configured to acquire the data, and then determine whether the data are real-time data or non-real-time data; and if the data are real-time data, to store the real-time data into a first real-time data container; otherwise, to store the non-real-time data into a first non-real-time data container;

the bus terminals are further configured to acquire the data, and then determine whether the data are real-time data or non-real-time data; and if the data are real-time data, to store the real-time data into a second real-time data container; if the data are non-real-time data, to store the non-real-time data into a second non-real-time data container;

wherein the bus controller is configured to determine whether the bus controller operates in the time slice thereof, and if the bus controller operates in the time slice thereof, to retrieve the real-time data from the first real-time data container in the time slice as the first data to be transmitted, and to transmit the first data; and if the real-time data container is empty, to retrieve the data from the first non-real-time data controller as the first data, and to transmit the first data; and the bus terminals are configured to determine whether the bus terminals operate in their respective time slices, and if the bus terminals operate in their respective time slices, to retrieve the real-time data from the second real-time data container in the time slices as the second data to be transmitted, and to transmit the second data; and if the real-time data container is empty, to retrieve the data from the second non-real-time data controller as the second data, and to transmit the second data.

2. The system according to claim 1, wherein the bus controller is further configured, if the bus controller does not operate in its time slice, to retrieve the data from the first non-real-time data container, and to transmit the retrieved non-real time data using carrier sense multiple access/collision detection (CSMA/CD); and the bus terminals are further configured to, if the bus terminals do not operate in their respective time slices, to retrieve the data from the second non-real-time data container, and to transmit the retrieved non-real time data using carrier sense multiple access/collision detection(CSMA/CD).

3. The system according to claim 1, wherein if it is determined that the data acquired are real-time data, then the bus controller and the bus terminals are configured to transmit the data in the time slices over the Time-Triggered Ethernet (TTE) or the Time Division Multiple Access (TDMA).

4. The system according to claim 1, wherein the bus controller is further configured to obtain data to be transmitted to an external network, to convert the data into a message in a format corresponding to the external network, and to transmit the message to the external network.

5. The system according to claim 1, wherein the bus controller is further configured to learn Media Access Control (MAC) addresses of devices over the two-wire data transmission network, to allocate corresponding Internet Protocol Address (IP) addresses and bus device addresses for the respective learnt MAC addresses, and to update a pre-created three-dimension correspondence relationship using the learnt MAC addresses, and the corresponding IP addresses and bus device addresses; and to determine for each piece of data received over the two-wire data transmission network whether a correspondence relationship between a MAC address, an IP address, and a bus device address carried in the data is among the three-dimension correspondence relationship, and if so, to determine that the data are legal data; otherwise, to determine that the data are illegal data.

6. The system according to claim 5, wherein the bus controller is further configured to transmit the three-dimension correspondence relationship to the respective bus terminals; and the respective bus terminals are further configured to determine for each piece of data received over the two-wire data transmission network whether a correspondence relationship between a MAC address, an IP address, and a bus device address carried in the data is among the three-dimension correspondence relationship, and if so, to determine that the data are legal data; otherwise, to determine that the data are illegal data.

7. The system according to claim 1, wherein the bus controller is configured to transmit the first data to be transmitted, in the time slice thereof using orthogonal frequency division multiplexing (OFDM) or baseband transmission; and the bus terminals are configured to transmit the second data to be transmitted, in their respective time slices using orthogonal frequency division multiplexing or baseband transmission.

8. The system according to claim 7, wherein orthogonal frequency division multiplexing is applicable at the physical layer.

9. The system according to claim 1, wherein the system further comprises:

a bus configuration and monitoring element connected with the bus controller, configured to transmit configuration information or a supervision instruction for at least one device over the two-wire data transfer network to the bus controller so that the bus controller transmits the configuration information to the corresponding device; and to receive operating state information, transmitted by the bus controller, generated by at least one device over the two-wire data transfer network.

10. The system according to claim 9, wherein the bus configuration and monitoring element communicates with the bus controller over an RS485 bus; or the bus controller is further configured to allocate a time slice for the bus configuration and monitoring element, and the bus configuration and monitoring element is further configured to communicate with the bus controller in its time slice using orthogonal frequency division multiplexing or baseband transmission.

11. The system according to claim 1, wherein the system further comprises:

an application monitoring device connected with the bus controller, configured to acquire data and control in real-time for the bus controller and the respective bus terminals.

* * * * *